(12) United States Patent
Chuang et al.

(10) Patent No.: US 7,423,819 B1
(45) Date of Patent: Sep. 9, 2008

(54) FIXED-FOCUS LENS

(75) Inventors: Fu-Ming Chuang, Hsinchu (TW);
Yi-Hao Kang, Hsinchu (TW); Hsin-Te Chen, Hsinchu (TW); Yun-Chin Liang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/969,661

(22) Filed: Jan. 4, 2008

(30) Foreign Application Priority Data

May 22, 2007 (TW) .................................. 96118188

(51) Int. Cl.
*G02B 13/04* (2006.01)

(52) U.S. Cl. .................... 359/753; 359/651; 359/716; 359/740; 359/788

(58) Field of Classification Search ................ 359/651, 359/716, 740, 788, 753
See application file for complete search history.

(56) References Cited

U.S. PATENT DOCUMENTS

| 4,062,622 | A  | * | 12/1977 | Sugiyama ................ 359/750 |
| 6,542,316 | B2 |   | 4/2003  | Yoneyama |
| 6,912,095 | B2 | * | 6/2005  | Yamada ................... 359/689 |
| 6,989,946 | B2 |   | 1/2006  | Kobayashi et al. |
| 7,006,300 | B2 | * | 2/2006  | Shinohara ............... 359/689 |
| 2002/0005994 | A1 | * | 1/2002 | Shikama ................ 359/749 |

* cited by examiner

*Primary Examiner*—Evelyn A. Lester
(74) *Attorney, Agent, or Firm*—J.C. Patents

(57) ABSTRACT

A fixed-focus lens including a first lens group, a second lens group, and a third lens group is provided. The first lens group has a negative refractive power, includes a plurality of lenses, and is disposed between an object side and an image side. The lenses of the first lens group include at least one aspheric lens. The second lens group is disposed between the first lens group and the image side and has a positive refractive power. The third lens group is disposed between the second lens group and the image side and has a positive refractive power. The third lens group includes a first triple cemented lens and a second triple cemented lens arranged from the object side to the image side in sequence.

25 Claims, 10 Drawing Sheets

Transverse Ray Fan Plot

FIXED-FOCUS LENS

CROSS-REFERENCE TO RELATED APPLICATION

This application claims the priority benefit of Taiwan application serial no. 96118188, filed on May 22, 2007. The entirety of the above-mentioned patent application is hereby incorporated by reference herein and made a part of this specification.

BACKGROUND OF THE INVENTION

1. Field of the Invention

The present invention relates to a lens. More particularly, the present invention relates to a fixed-focus lens.

2. Description of Related Art

Referring to FIG. 1, U.S. Pat. No. 6,989,946 has disclosed a conventional fixed-focus lens 100 applied in a rear projection television (RPTV), which includes a first lens group 110 and a second lens group 120 arranged from an object side to an image side in sequence. A liquid crystal light valve 50 is disposed at the image side. The first lens group 110 includes two lenses 112 and 114 arranged from the object side to the liquid crystal light valve 50 in sequence. The second lens group 120 includes seven lenses 122a, 122b, 124, 126a, 126b, 126c, and 128 arranged from the object side to the liquid crystal light valve 50 in sequence. The lenses 122a and 122b constitute a cemented lens 122, and the lenses 126a, 126b and 126c constitute another cemented lens 126.

Since the field of view (FOV) of the conventional fixed-focus lens 100 is not large enough (the maximum FOV is about 95°), the optical distance between the lens 112 and the screen (not shown) disposed at the object side must be very long for projecting the picture of an appropriate size onto the screen, which results in a large volume of the RPTV. However, if the refractive power of each lens of the fixed-focus lens 100 is adjusted to increase the FOV so as to reduce the above optical distance, the aberration of the picture projected on the screen will be too large.

SUMMARY OF THE INVENTION

The present invention provides a fixed-focus lens, which has a large FOV and is capable of effectively reducing or eliminating aberration and chromatic aberration.

Other advantages of the present invention can be further understood from the technical features disclosed in the present invention.

In order to achieve one or a part of or all of the above advantages or other advantages, a fixed-focus lens including a first lens group, a second lens group, and a third lens group is provided in an embodiment of the present invention. The first lens group has a negative refractive power, includes a plurality of lenses, and is disposed between an object side and an image side. The plurality of lenses of the first lens group includes at least one aspheric lens. The second lens group is disposed between the first lens group and the image side and has a positive refractive power. The second lens group includes two lenses arranged from the object side to the image side, and refractive powers of the two lenses of the second lens group are positive. The third lens group is disposed between the second lens group and the image side and has a positive refractive power. The third lens group includes a first triple cemented lens and a second triple cemented lens arranged from the object side to the image side in sequence.

A fixed-focus lens including a first lens group, a second lens group, and a third lens group is provided in another embodiment of the present invention. The first lens group has a negative refractive power, includes a plurality of lenses, and is disposed between an object side and an image side. The plurality of lenses of the first lens group includes at least one aspheric lens. The second lens group is disposed between the first lens group and the image side and has a positive refractive power. The second lens group includes two lenses arranged from the object side to the image side, and refractive powers of the two lenses of the second lens group are positive. The third lens group is disposed between the second lens group and the image side and has a positive refractive power. The third lens group includes a first triple cemented lens and a second triple cemented lens arranged from the object side to the image side in sequence. The fixed-focus lens satisfies: $1.0<|f_1/f|<3.3$ and $5.4<|f_2/f|<9.6$, where f is an effective focal length (EFL) of the fixed-focus lens, $f_1$ is an EFL of the first lens group, and $f_2$ is an EFL of the second lens group.

In the fixed-focus lens of the present invention, each of the lenses constituting the first lens group is mainly used to receive the light beam of a large field of view (FOV), such that the fixed-focus lens in the present invention has a larger FOV. Moreover, the aspheric lens in the first lens group is used to reduce or eliminate the distortion and the aberration of optical imaging. The two triple cemented lenses of the third lens group, each constituted of three lenses, further reduce or eliminate the aberration and chromatic aberration of optical imaging. Therefore, the fixed-focus lens of the present invention has the advantages of a large FOV, smaller aberration and chromatic aberration of imaging, and a lower distortion degree of imaging.

In order to make the aforementioned and other features and advantages of the present invention comprehensible, preferred embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
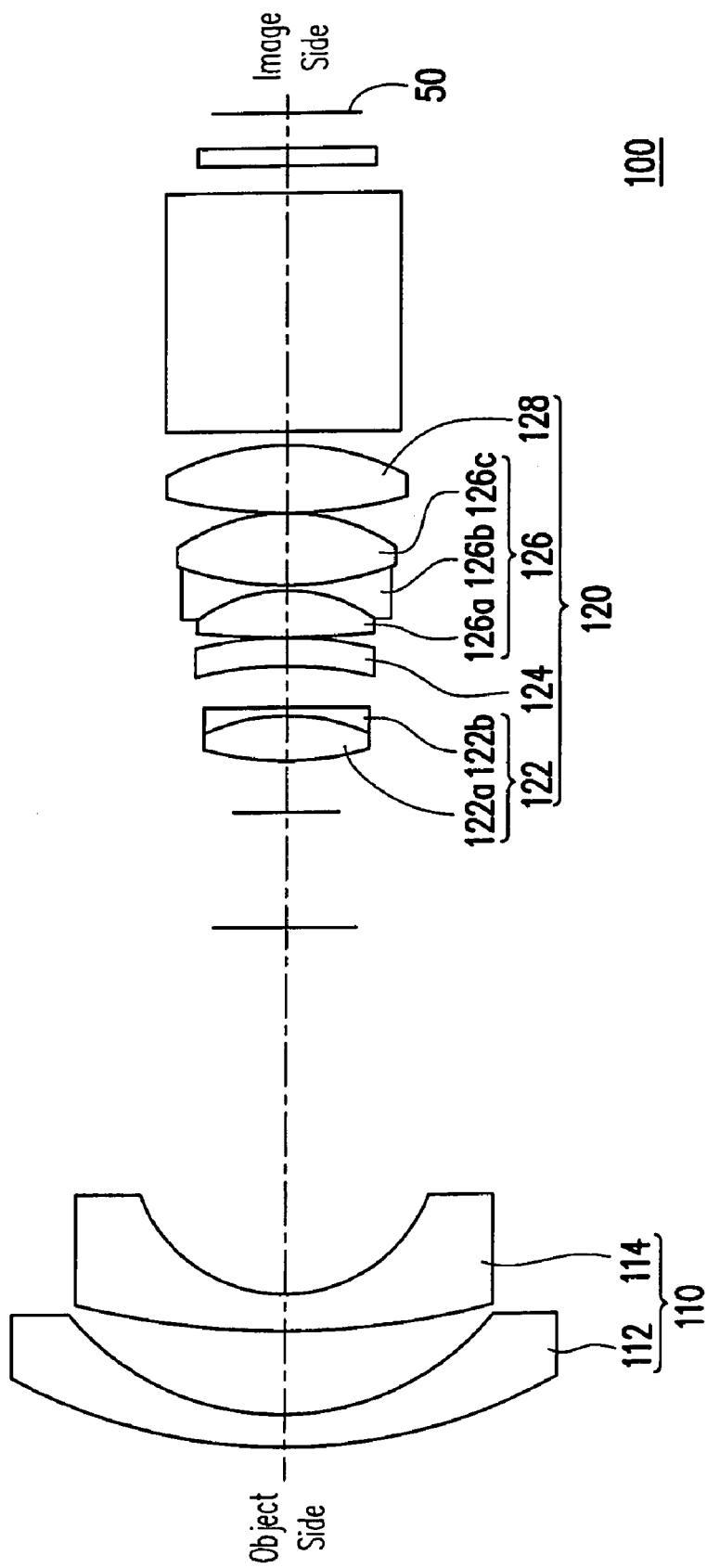
FIG. 1 is a schematic structural view of a conventional fixed-focus lens applied in a rear projection television (RPTV).
Figure 2:
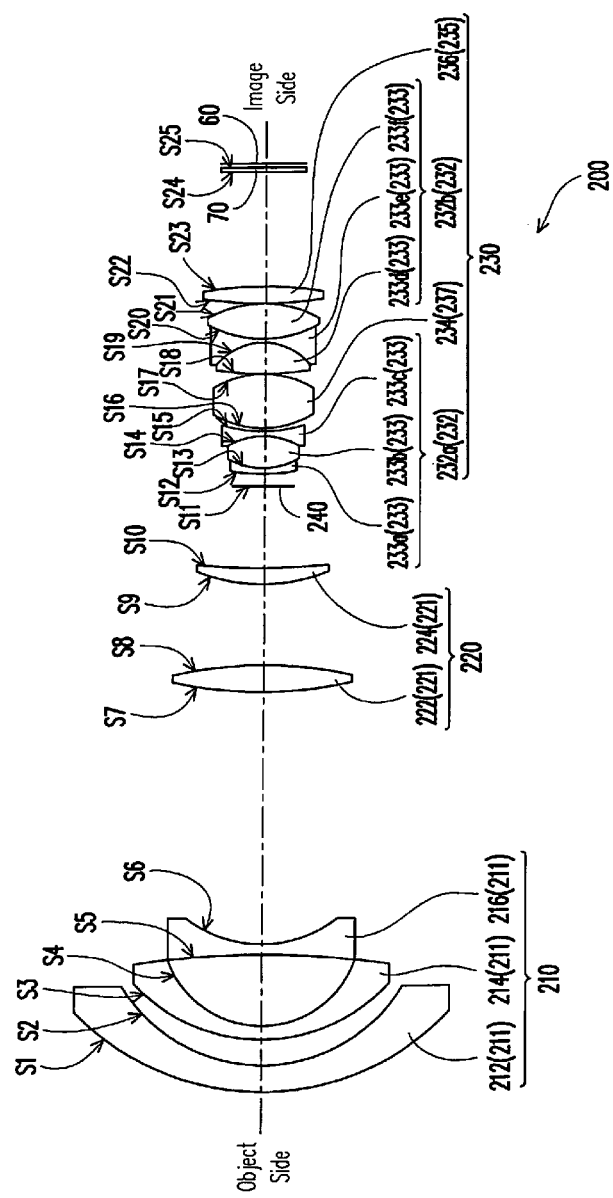
FIG. 2 is a schematic structural view of a fixed-focus lens according to an embodiment of the present invention.

Referring to FIG. 2, a fixed-focus lens 200 according to an embodiment of the present invention includes a first lens group 210, a second lens group 220, and a third lens group 230. The first lens group 210 has a negative refractive power, and includes at least one aspheric lens. The second lens group 220 is disposed between the first lens group 210 and the image side and has a positive refractive power. The third lens group 230 is disposed between the second lens group 220 and the image side and has a positive refractive power. In this embodiment, the lens 211 closest to the object side of the first lens group 210 is an aspheric lens. Moreover, the refractive powers of at least two of the lenses 211 of the first lens group 210 are negative. Furthermore, each of the above lenses 211 having the negative refractive power, of the first lens group 210, is a biconcave lens or convex-concave lens, for example. More particularly, in this embodiment, the first lens group 210 includes a first lens 212, a second lens 214, and a third lens 216 arranged from the object side to the image side in sequence. The refractive powers of the first lens 212, the second lens 214, and the third lens 216 are all negative, and the first lens 212 is an aspheric lens. Moreover, each of the first lens 212 and the second lens 214 is, for example, a convex-concave lens with a convex surface facing the object side, and the third lens 216 is, for example, a biconcave lens.

The second lens group 220 includes two lenses 221 arranged from the object side to the image side, and the refractive powers of the two lenses 221 of the second lens group 220 are positive. In this embodiment, each lens 221 of the second lens group 220 is, for example, a biconvex lens or a concave-convex lens. More particularly, the second lens group 220 includes a fourth lens 222 and a fifth lens 224 arranged from the object side to the image side in sequence. The fourth lens 222 is, for example, a biconvex lens, and the fifth lens 224 is, for example, a concave-convex lens with a convex surface facing the object side.

The third lens group 230 includes a first triple cemented lens 232a and a second triple cemented lens 232b arranged from the object side to the image side in sequence. In this embodiment, the lenses 233 constituting each triple cemented lens 232 are, for example, two lenses having positive refractive powers and one lens having a negative refractive power, or are two lenses having negative refractive powers and one lens having a positive refractive power. Moreover, the third lens group 230 further includes a lens 235 having a positive refractive power disposed between the second triple cemented lens 232b and the image side. In addition, the third lens group 230 further includes a lens 237 having a positive refractive power disposed between the first triple cemented lens 232a and the second triple cemented lens 232b.

More particularly, in this embodiment, the first triple cemented lens 232a includes a sixth lens 233a, a seventh lens 233b, and an eighth lens 233c arranged from the object side to the image side in sequence. The second triple cemented lens 232b includes a ninth lens 233d, a tenth lens 233e, and an eleventh lens 233f arranged from the object side to the image side in sequence. Refractive powers of the sixth lens 233a to the eleventh lens 233f are, for example, negative, positive, negative, positive, negative, and positive in sequence.

Moreover, the third lens group 230 further includes a twelfth lens 234 (i.e. the lens 237) and a thirteenth lens 236 (i.e. the lens 235). The twelfth lens 234 is disposed between the eighth lens 233c and the ninth lens 233d, and has a positive refractive power. The thirteenth lens 236 is disposed between the eleventh lens 233f and the image side, and has a positive refractive power. Moreover, the sixth lens 233a to the thirteenth lens 236 are, for example, a convex-concave lens with a convex surface facing the object side, a biconvex lens, a biconcave lens, a biconvex lens, a biconcave lens, a biconvex lens, a biconvex lens, and a biconvex lens in sequence.

Generally speaking, an image processing device 60 is disposed at the image side, and the image processing device 60 in this embodiment is, for example, a light valve. Moreover, in this embodiment, the fixed-focus lens 200 is adapted to form the image provided by the image processing device 60 at the object side. Furthermore, the fixed-focus lens 200 further includes an aperture stop 240 disposed between the second lens group 220 and the third lens group 230.

In order to ensure the optical imaging quality, the fixed-focus lens 200 in this embodiment satisfies at least one of the following five conditions: (i) $1.0<|f_1/f|<3.3$; (ii) $5.4<|f_2/f|<9.6$; (iii) $3.3<|f_3/f|<7.5$; (iv) $0.3<|f_C/f_3|<5.5$; (v) $0.21<|N_p-N_n|<0.35$, where f is an effective focal length (EFL) of the fixed-focus lens 200, $f_1$ is an EFL of the first lens group 210, $f_2$ is an EFL of the second lens group 220, and $f_3$ is an EFL of the third lens group 230. Moreover, $f_C$ is an EFL of any one of the triple cemented lenses 232, and the condition (iv) is adapted to both the first triple cemented lens 232a and the second triple cemented lens 232b. Furthermore, $N_p$ is a refractive index of any one of the lenses 233 having the positive refractive powers constituting each triple cemented lens 232, $N_n$ is a refractive index of any one of the lenses 233 having the negative refractive powers and constituting each triple cemented lens 232, and the condition (v) is adapted to both the first triple cemented lens 232a and the second triple cemented lens 232b.

In the fixed-focus lens 200, each of the lenses 211 constituting the first lens group 210 is mainly used to receive light with a larger field of view (FOV), such that the fixed-focus lens 200 of the present invention has a larger FOV. In this embodiment, the maximum FOV of the fixed-focus lens 200 is up to about 115°. As such, when the fixed-focus lens 200 is, for example, applied in a rear projection television (RPTV), the optical distance between the fixed-focus lens 200 and an the screen positioned at the object side is reduced effectively, such that the RPTV has a small volume and a thin thickness. Moreover, the aspheric lens in the first lens group 210 is used to reduce or eliminate the distortion and the aberration of the optical imaging. Furthermore, the first triple cemented lens 232a and the second triple cemented lens 232b, each constituted of three lenses 233, of the third lens group 230 is constituted of the lenses 233 having high Abbe numbers (i.e. dispersion coefficients) and low Abbe numbers, so as to further reduce or eliminate the aberration and the chromatic aberration of the optical imaging. Therefore, the fixed-focus lens 200 of this embodiment has the advantages of a larger FOV, a smaller aberration and chromatic aberration of imaging, and a lower distortion degree of imaging.

An embodiment of the fixed-focus lens 200 is given hereinafter. It should be noted that, the data listed in Table 1 and Table 2 is not intended to limit the present invention, those of ordinary skill in the art can make appropriate alternations on the parameters or settings with reference to the present invention, which still fall within the scope of the present invention.

TABLE 1

| Surface | Radius of Curvature (mm) | Distance (mm) | Refractive Index | Abbe Number | Remarks |
|---|---|---|---|---|---|
| S1 | 102.156 | 5.43 | 1.49 | 57.44 | First Lens |
| S2 | 25.170 | 6.63 | | | |
| S3 | 39.466 | 3.39 | 1.76 | 40.10 | Second Lens |
| S4 | 23.641 | 16.55 | | | |
| S5 | −114.239 | 2.53 | 1.83 | 37.16 | Third Lens |
| S6 | 28.205 | 76.75 | | | |
| S7 | 89.823 | 6.10 | 1.65 | 33.79 | Fourth Lens |
| S8 | −114.490 | 19.30 | | | |
| S9 | 37.092 | 3.73 | 1.65 | 33.79 | Fifth Lens |
| S10 | 84.105 | 19.16 | | | |
| S11 | Infinity | 3.00 | | | Aperture Stop |
| S12 | 234.218 | 1.20 | 1.83 | 42.71 | Sixth Lens |
| S13 | 16.066 | 8.17 | 1.50 | 81.55 | Seventh Lens |
| S14 | −14.087 | 1.20 | 1.83 | 37.16 | Eighth Lens |
| S15 | 5672.997 | 0.20 | | | |
| S16 | 22.509 | 11.57 | 1.49 | 70.24 | Twelfth Lens |
| S17 | −24.653 | 0.20 | | | |
| S18 | 104.440 | 7.81 | 1.49 | 70.24 | Ninth Lens |
| S19 | −14.241 | 1.20 | 1.83 | 37.16 | Tenth Lens |
| S20 | 27.562 | 7.51 | 1.50 | 81.55 | Eleventh Lens |
| S21 | −30.500 | 0.20 | | | |
| S22 | 75.145 | 4.90 | 1.85 | 23.78 | Thirteenth Lens |
| S23 | −52.804 | 25.99 | | | |
| S24 | Infinity | 1.05 | 1.52 | 64.14 | Cover Glass |
| S25 | Infinity | 1.10 | | | |

In Table 1, the distance refers to a linear distance along the main axis between two neighboring surfaces. For example, the distance of Surface S1 is the linear distance along the main axis between Surface S1 and Surface S2. As for the corresponding thickness, refractive index, and Abbe number of each lens in the Remarks column, refer to the numeral value of each distance, refractive index, and Abbe number in the same row. Moreover, in Table 1, surfaces S1 and S2 are two surfaces of the first lens 212, surfaces S3 and S4 are two surfaces of the second lens 214, surfaces S5 and S6 are two surfaces of the third lens 216, surfaces S7 and S8 are two surfaces of the fourth lens 222, surfaces S9 and S10 are two surfaces of the fifth lens 224, and surface S11 is the aperture stop 240. Surface S12 is the surface facing the object side of the sixth lens 233a, surface S13 is the surface connecting the sixth lens 233a and the seventh lens 233b, surface S14 is a surface connecting the seventh lens 233b and the eighth lens 233c, and surface S15 is the surface facing the image side of the eighth lens 233c. Surfaces S16 and S17 are two surfaces of the twelfth lens 234. Surface S18 is the surface facing the object side of the ninth lens 233d, surface S19 is the surface connecting the ninth lens 233d and the tenth lens 233e, surface S20 is the surface connecting the tenth lens 233e and the eleventh lens 233f, and surface S21 is the surface facing the image side of the eleventh lens 233f. Surfaces S22 and S23 are two surfaces of the thirteenth lens 236. Surfaces S24 and S25 are two surfaces of a cover glass 70 used for protecting the image processing device 60. The distance listed in the row of surface S25 is the distance from surface S25 to the image processing device 60.

The numeral values of the parameters such as the radius of curvature and the distance of each surface are given in Table 1, and will not be repeated herein again.

The above Surfaces S1 and S2 are aspheric surfaces with even power, and are expressed by the following formula:

$$Z = \frac{cr^2}{1+\sqrt{1-(1+k)c^2r^2}} + A_2r^2 + A_4r^4 + A_6r^6 + A_8r^8 + A_{10}r^{10}$$

In the formula, Z is a sag in the direction of the optical axis, and c is the inverse of the radius of an osculating sphere, i.e. the inverse of the radius of curvature (e.g., the radius of curvatures of S1 and S2 in the Table) close to the optical axis. k is a conic coefficient, r is an aspheric height, i.e. the height from the center to the edge of the lens, and $A_2, A_4, A_6, A_8, A_{10}$, etc. are aspheric coefficients, in which the coefficient $A_2$ is 0 in this embodiment. The parameter values of Surfaces S1 and S2 are listed in Table 2.

TABLE 2

| Aspheric Parameter | Conic Coefficient k | Coefficient $A_4$ | Coefficient $A_6$ | Coefficient $A_8$ | Coefficient $A_{10}$ |
|---|---|---|---|---|---|
| S1 | 4.381406 | 1.923978E−06 | −1.119817E−09 | 5.066682E−13 | −9.348261E−17 |
| S2 | −0.596964 | −2.469959E−06 | −5.289398E−09 | 1.430566E−12 | −7.725140E−16 |

In view of the above, in the fixed-focus lens 200 in this embodiment, $|f_1/f|=1.91$, $|f_2/f|=8.09$, $|f_3/f|=5.91$, and $0.63<|f_C/f_3|<2.19$.

Figure 3A:
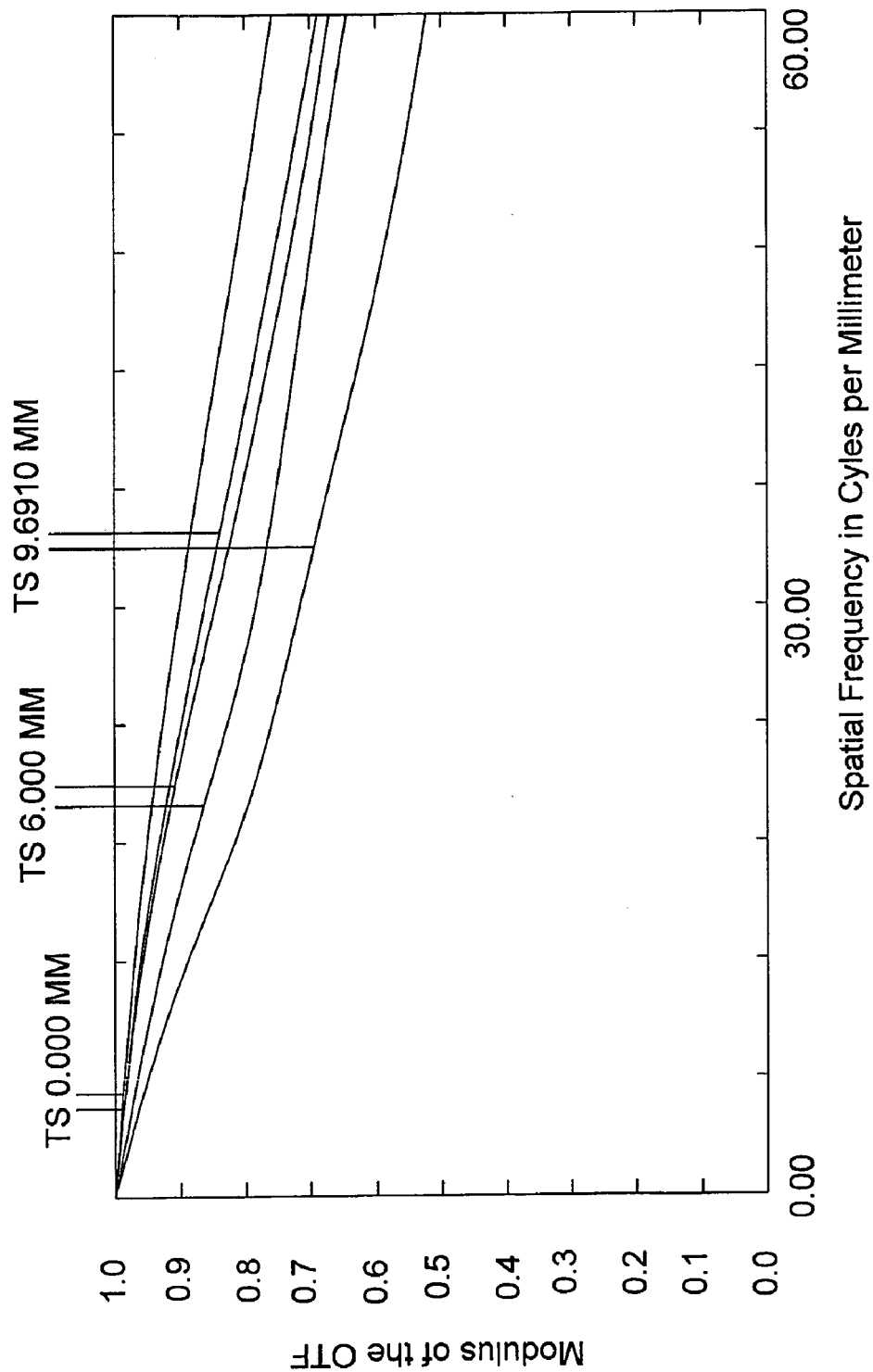
FIGS. 3A to 3C are diagrams showing optical simulation data of imaging of the fixed-focus lens in FIG. 2.
Figure 3B:
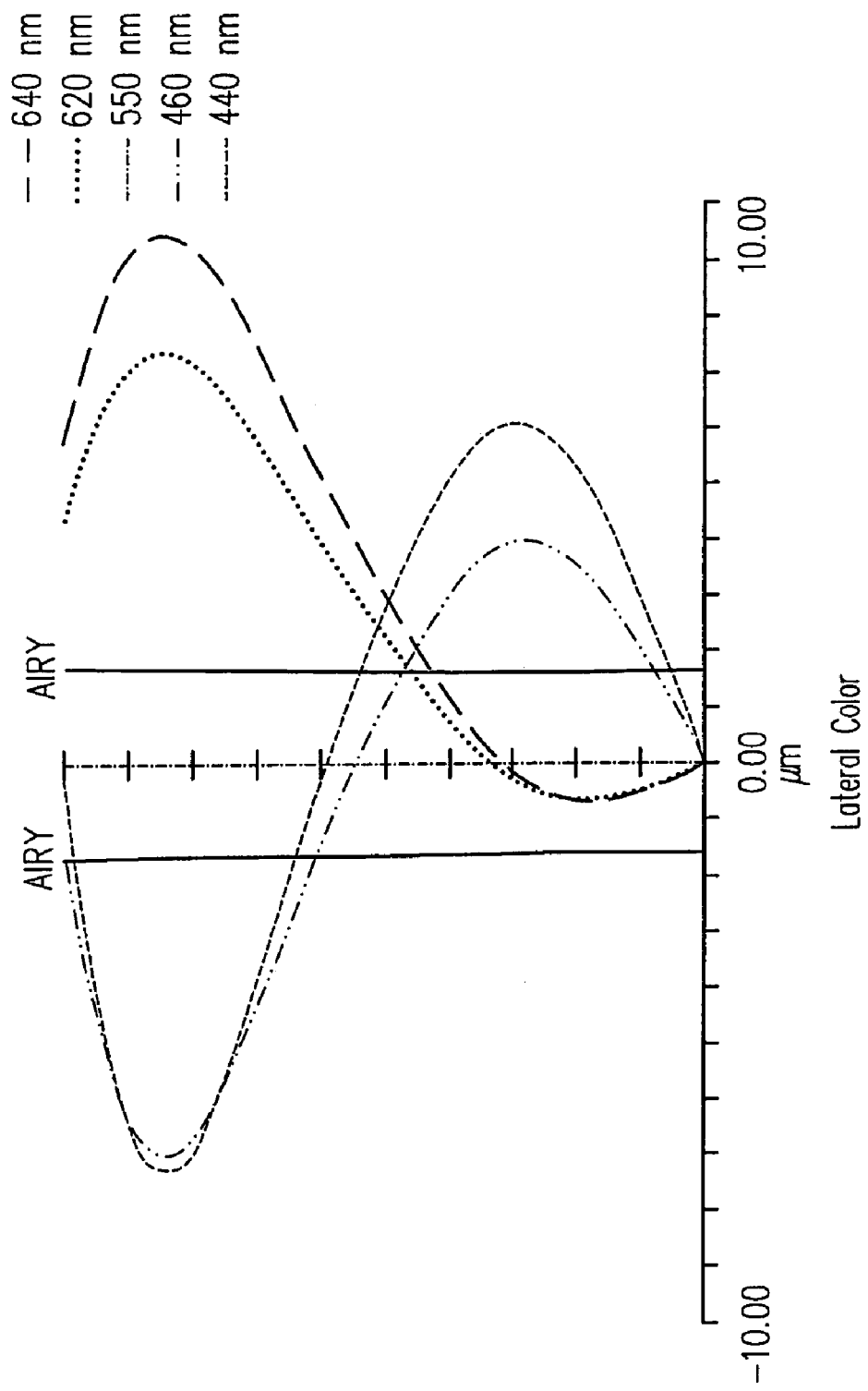
Figure 3C:
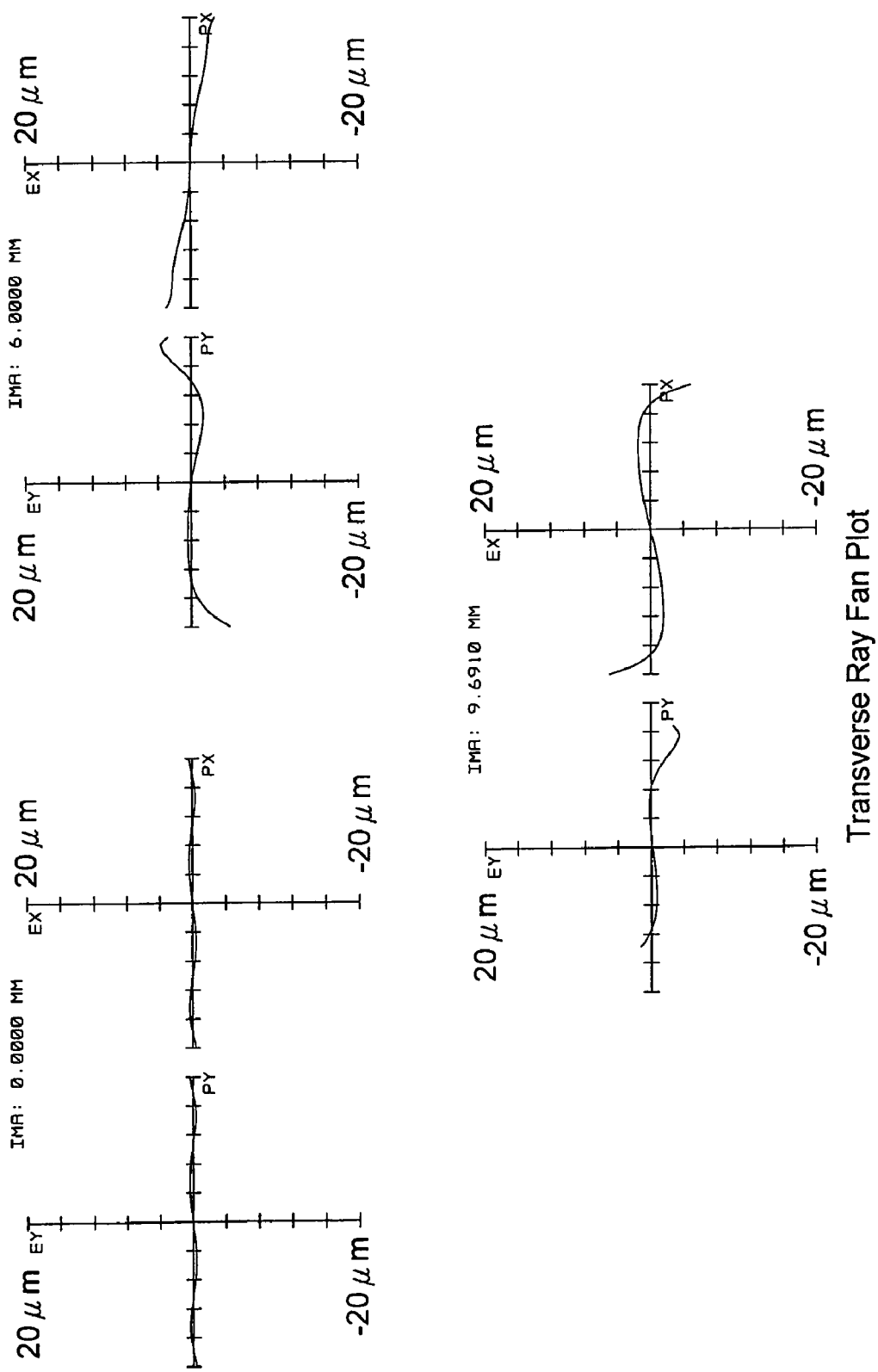

Referring to FIGS. 3A to 3C, FIG. 3A is a modulation transfer function (MTF) graph, in which the transverse axis is a spatial frequency in cycles per millimeter, and the longitudinal axis is a modulus of the optical transfer function (OTF). FIG. 3A is a simulation data graph using the light beam having a wavelength between 440 nm and 640 nm in this embodiment. Moreover, FIG. 3B is a lateral color diagram of the image in this embodiment. In FIG. 3B, the maximum field is 9.6910 mm, and the reference wavelength is 550 nm. FIG. 3C is a transverse ray fan plot of the image in this embodiment. Since the graphics in FIGS. 3A to 3C fall within the standard range, the fixed-focus lens 200 in this embodiment maintains a good imaging quality while having a larger FOV.

Figure 4:
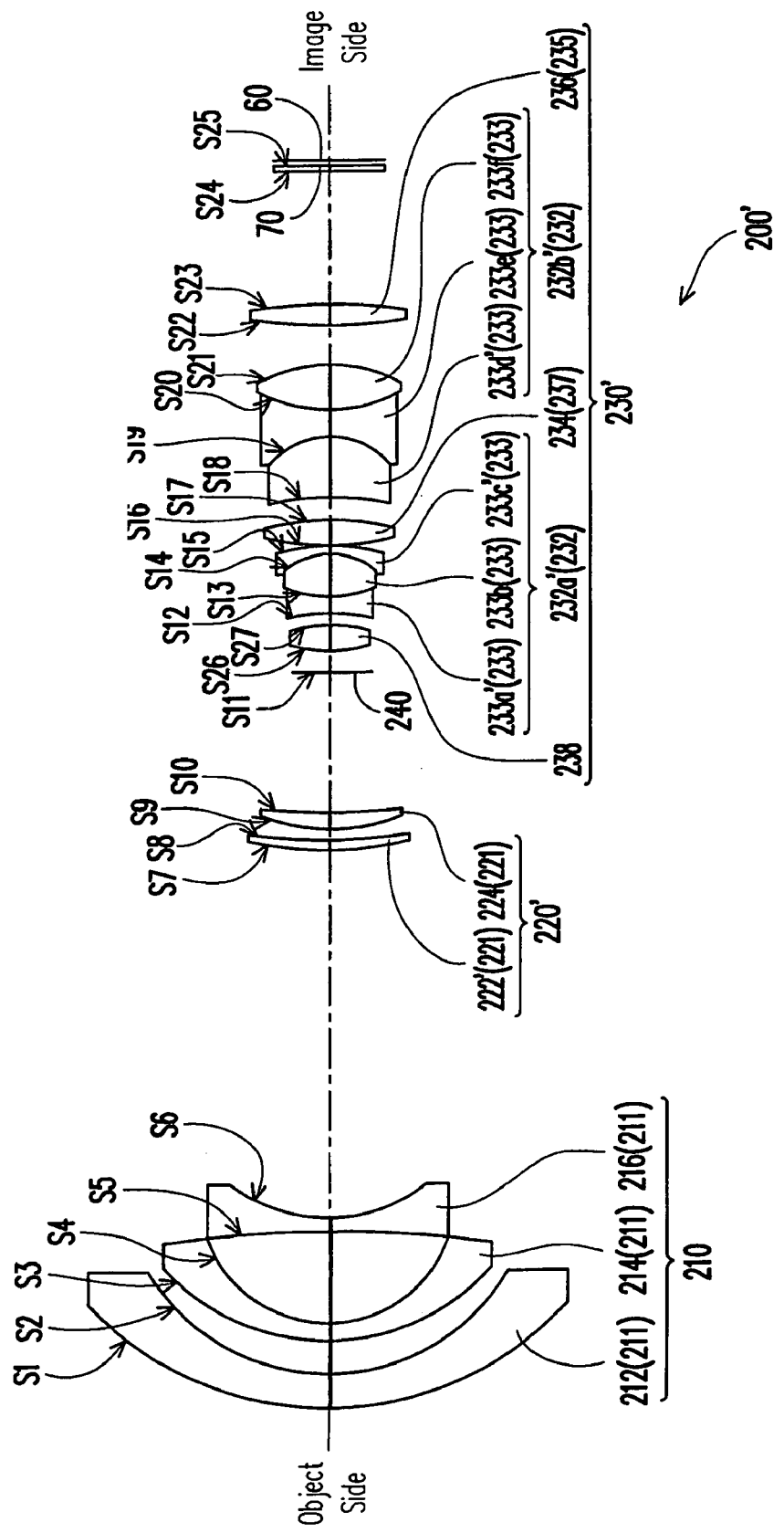
FIG. 4 is a schematic structural view of a fixed-focus lens according to another embodiment of the present invention.

Referring to FIG. 4, the fixed-focus lens 200' in another embodiment of the present embodiment is similar to the above fixed-focus lens 200, the differences between the two are mentioned below. The fixed-focus lens 200' further includes a fourteenth lens 238 having a positive refractive power disposed between the second lens group 220' and the sixth lens 233a'. Moreover, in this embodiment, the fourth lens 222' of the second lens group 220' is, for example, a concave-convex lens with the convex surface facing the object side. In addition, in the third lens group 230', the sixth lens 233a' and the eighth lens 233c' of the first triple cemented lens 232a' are, for example, a biconcave lens and a convex-concave lens with a convex surface facing the image side respectively, and the ninth lens 233d' of the second triple cemented lens 232b' is, for example, a concave-convex lens with the convex surface facing the image side. Furthermore, the fourteenth lens 238 is, for example, a biconvex lens. The fixed-focus lens 200' in this embodiment also has the advantages and effects of the above fixed-focus lens 200, and the details will not be repeated herein again.

An embodiment of the fixed-focus lens 200' is given hereinafter, but is not intended to limit the present invention. Please see FIG. 4, Table 3, and Table 4.

TABLE 3

| Surface | Radius of Curvature (mm) | Distance (mm) | Refractive Index | Abbe Number | Remarks |
|---|---|---|---|---|---|
| S1 | 57.078 | 7.41 | 1.49 | 57.44 | First Lens |
| S2 | 20.487 | 7.18 | | | |

TABLE 3-continued

| Surface | Radius of Curvature (mm) | Distance (mm) | Refractive Index | Abbe Number | Remarks |
|---|---|---|---|---|---|
| S3 | 35.994 | 3.98 | 1.72 | 47.96 | Second Lens |
| S4 | 22.325 | 23.79 | | | |
| S5 | −71.057 | 4.66 | 1.81 | 40.93 | Third Lens |
| S6 | 56.345 | 84.37 | | | |
| S7 | 71.499 | 2.38 | 1.74 | 28.30 | Fourth Lens |
| S8 | 1182.076 | 1.41 | | | |
| S9 | 33.168 | 2.90 | 1.67 | 39.27 | Fifth Lens |
| S10 | 61.950 | 26.09 | | | |
| S11 | Infinity | 4.79 | | | Aperture Stop |
| S26 | 77.971 | 4.21 | 1.49 | 70.24 | Fourteenth Lens |
| S27 | −23.519 | 0.20 | | | |
| S12 | −24.486 | 3.20 | 1.83 | 37.16 | Sixth Lens |
| S13 | 24.529 | 8.64 | 1.49 | 70.21 | Seventh Lens |
| S14 | −13.406 | 1.18 | 1.80 | 34.97 | Eighth Lens |
| S15 | −54.686 | 0.93 | | | |
| S16 | 47.120 | 5.69 | 1.50 | 81.55 | Twelfth Lens |
| S17 | −29.977 | 2.06 | | | |
| S18 | −232.955 | 11.95 | 1.61 | 40.36 | Ninth Lens |
| S19 | −23.207 | 5.42 | 1.83 | 37.35 | Tenth Lens |
| S20 | 32.953 | 9.67 | 1.50 | 81.55 | Eleventh Lens |
| S21 | −34.539 | 9.52 | | | |
| S22 | 52.754 | 6.00 | 1.76 | 26.52 | Thirteenth Lens |
| S23 | −112.684 | 26.90 | | | |
| S24 | Infinity | 1.05 | 1.52 | 64.14 | Cover Glass |
| S25 | Infinity | 1.10 | | | |

The above Surfaces S1 and S2 are aspheric surfaces with odd power, and are expressed by the following formula:

$$Z = \frac{cr^2}{1+\sqrt{1-(1+k)c^2r^2}} + A_1 r^1 + A_2 r^2 + A_3 r^3 + A_4 r^4 + A_5 r^5 + A_6 r^6 + A_7 r^7 + A_8 r^8 + A_9 r^9 + A_{10} r^{10}$$

In the formula, Z is a sag in the direction of the optical axis, and c is the inverse of the radius of an osculating sphere, i.e. the inverse of the radius of curvature (e.g., the radius of curvatures of S1 and S2 in the Table) close to the optical axis. k is a conic coefficient, r is an aspheric height, i.e. the height from the center to the edge of the lens, and $A_1$, $A_2$, $A_3$, $A_4$, $A_5$, ..., $A_{10}$ are aspheric coefficients. The parameter values of Surfaces S1 and S2 are listed in Table 4.

TABLE 4

| Aspheric Parameter | Conic Coefficient k | Coefficient $A_1$ | Coefficient $A_2$ | Coefficient $A_3$ |
|---|---|---|---|---|
| S1 | 0.3923313 | 1.230589E−03 | −5.951110E−04 | −1.498910E−04 |
| S2 | −0.7410114 | 1.303240E−03 | −9.738936E−04 | −1.725425E−04 |

| Aspheric Parameter | Coefficient $A_4$ | Coefficient $A_5$ | Coefficient $A_6$ | Coefficient $A_7$ |
|---|---|---|---|---|
| S1 | 2.076032E−06 | 6.650830E−08 | −1.880886E−09 | −4.235721E−12 |
| S2 | −5.135713E−07 | 4.444413E−08 | −4.507613E−09 | 3.419737E−11 |

| Aspheric Parameter | Coefficient $A_8$ | Coefficient $A_9$ | Coefficient $A_{10}$ |
|---|---|---|---|
| S1 | 3.896985E−13 | 1.438465E−15 | −7.076699E−17 |
| S2 | 9.614580E−13 | −6.467689E−15 | −8.259126E−16 |

In Table 3, surfaces S1-S6, S9-S11, S16, S17, and S20-S25 are identical with surfaces S1-S6, S9-S11, S16, S17, and S20-S25 in Table 1. Surfaces S7 and S8 are two surfaces of the fourth lens 222'. Surface S12 is the surface facing the object side of the sixth lens 233a', surface S13 is the surface connecting the sixth lens 233a' and the seventh lens 233b, surface S14 is the surface connecting the seventh lens 233b and the eighth lens 233c', and surface S15 is the surface facing the image side of the eighth lens 233c'. Surface S18 is the surface facing the object side of the ninth lens 233d', and surface S19 is the surface connecting the ninth lens 233d' and the tenth lens 233e. Surface S26 and S27 are two surfaces of the fourteenth lens 238.

In view of the above, in the fixed-focus lens 200' in this embodiment, $|f_1/f|=1.68$, $|f_2/f|=6.16$, $|f_3/f|=4.58$, and $0.43<|f_c/f_3|<4.29$.

Figure 5A:
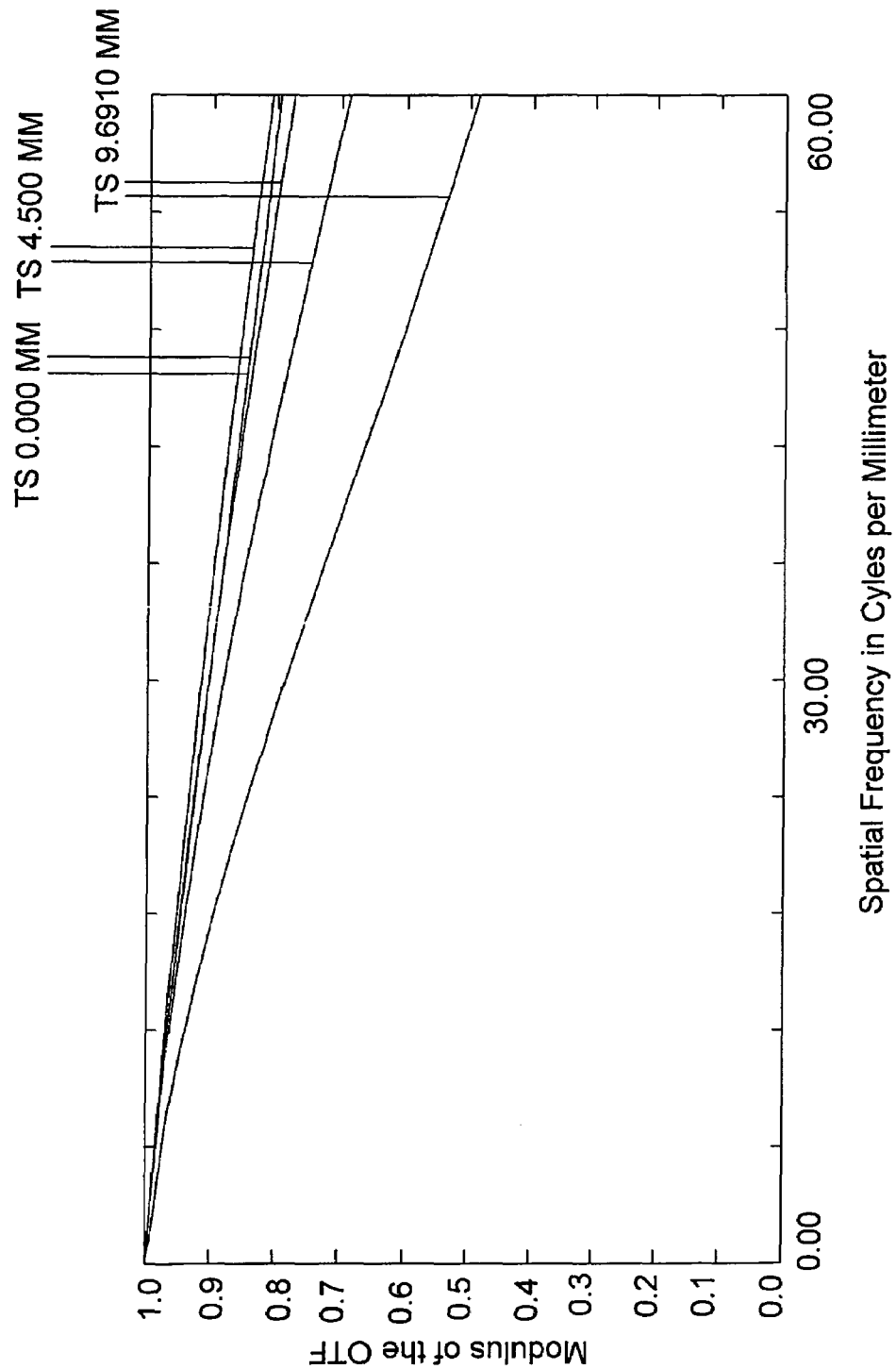
FIGS. 5A to 5C are diagrams showing optical simulation data of imaging of the fixed-focus lens in FIG. 4.
Figure 5B:
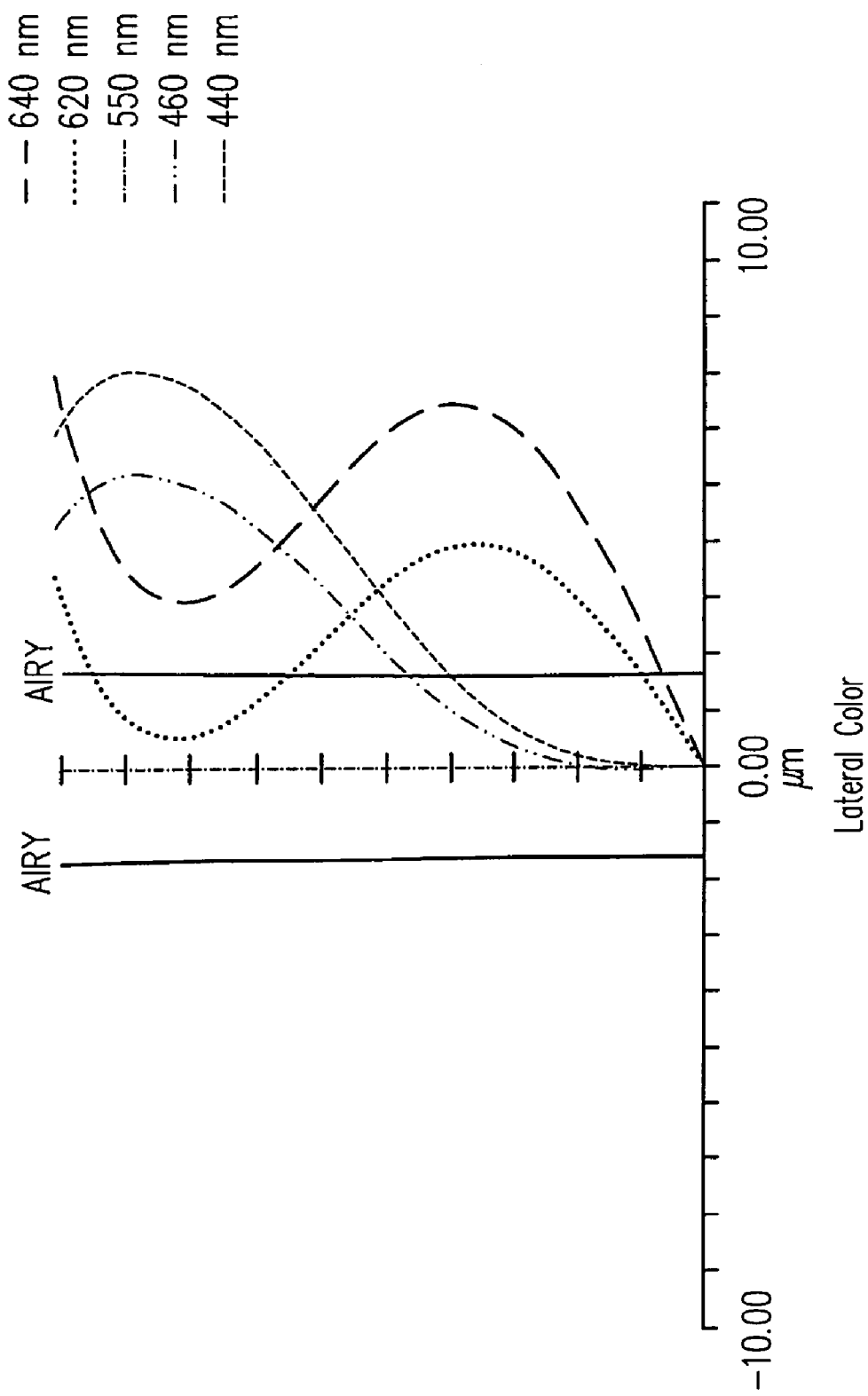
Figure 5C:
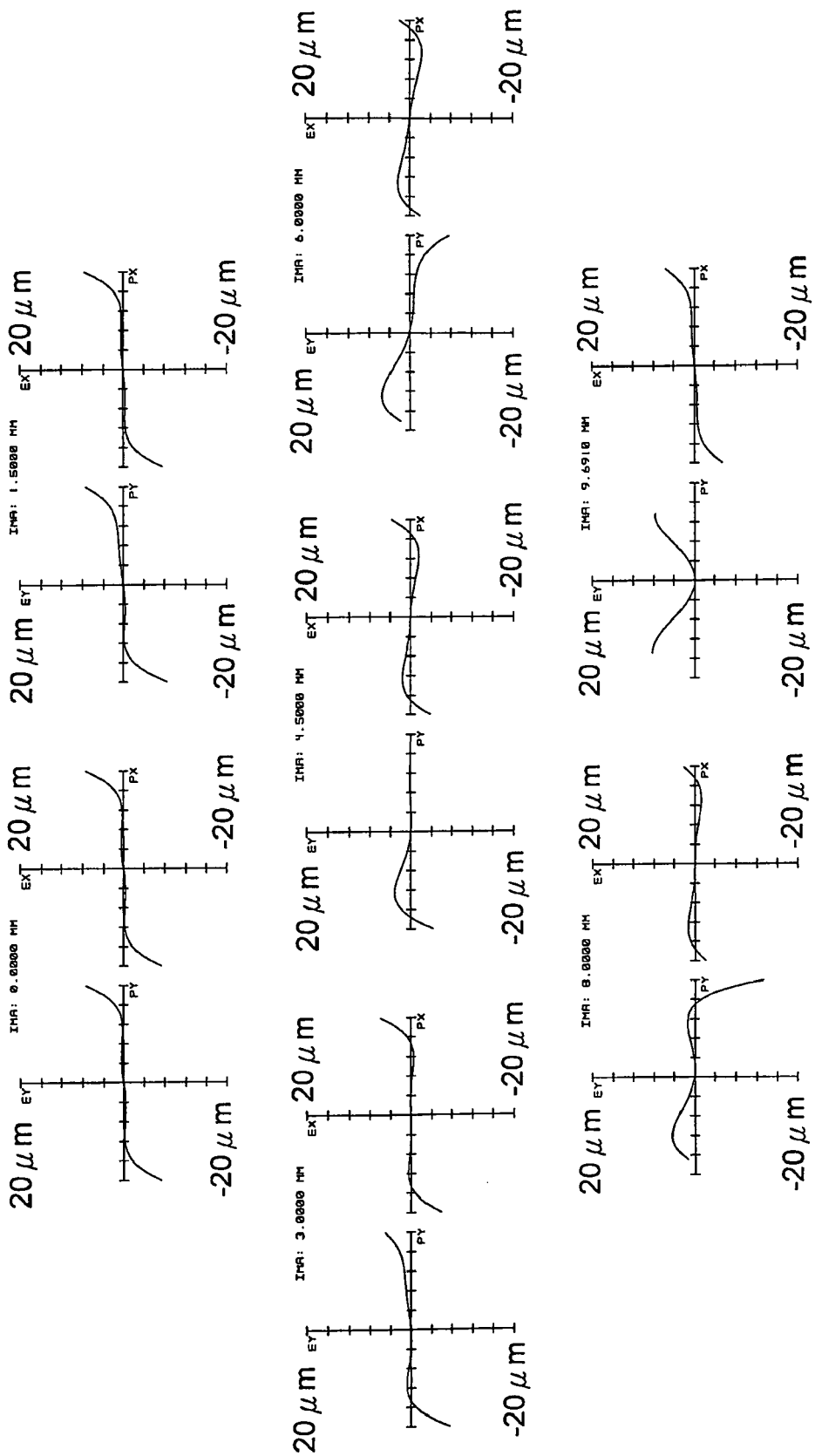

Referring to FIGS. 5A to 5C, FIG. 5A is a MTF graph, in which the transverse axis is a spatial frequency in cycles per millimeter, and the longitudinal axis is a modulus of the OTF. FIG. 5A is a simulation data graph using the light having a wavelength between 440 nm and 640 nm in this embodiment. Moreover, FIG. 5B is a lateral color diagram of the image in this embodiment. In FIG. 5B, the maximum field is 9.6910 mm, and the reference wavelength is 550 nm. FIG. 5C is a transverse ray fan plot of the image in this embodiment. Since the graphics in FIGS. 5A to 5C fall within the standard range, the fixed-focus lens 200 maintains a preferred imaging quality while having a larger FOV.

Figure 6:
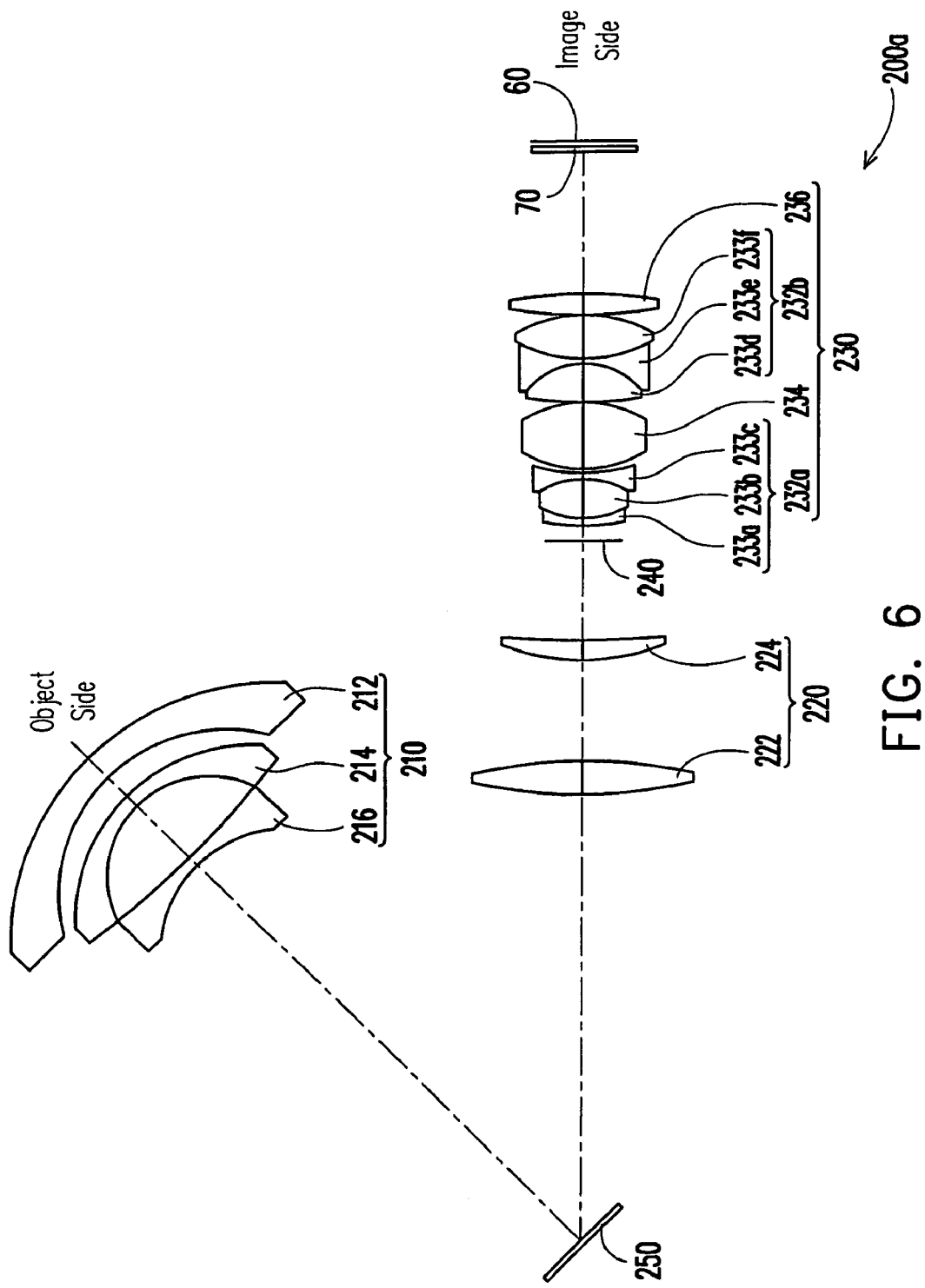
FIG. 6 is a schematic structural view of a fixed-focus lens according to still another embodiment of the present invention.

Referring to FIG. 6, the fixed-focus lens 200a in still another embodiment of the present embodiment is similar to the above fixed-focus lens 200 (referring to FIG. 2), the differences between the two are mentioned below. The fixed-focus lens 200a further includes a reflecting device 250 disposed between the first lens group 210 and the second lens group 220 for reflecting the light beams from the second lens group 220 to the first lens group 210. In this embodiment, the fixed-focus lens 200a is designed into an L-shaped lens. Since the fixed-focus lens 200a has a relatively short length, the RPTV, for example, adopting the fixed-focus lens 200a may be made thinner. The reflecting device 250 may also be applied in the fixed-focus lens 200 or the fixed-focus lens 200' to form another L-shaped lens.

In view of the above, in the fixed-focus lens according to the embodiment of the present invention, each of the lenses constituting the first lens group is mainly used to receive light of a large FOV, such that the fixed-focus lens in the present invention has a larger FOV. The maximum FOV of the fixed-focus lens according to an embodiment of the present invention is up to about 115°. As such, when the fixed-focus lens in the present invention is, for example, applied in the RPTV, the optical distance between the fixed-focus lens and the screen is effectively reduced, and thus the RPTV is made to have a smaller volume and a thinner thickness. Moreover, the aspheric lens in the first lens group is used to reduce or eliminate the distortion and the aberration of the optical imaging.

Furthermore, the two triple cemented lenses, each constituted of three lenses, of the third lens group are used to further reduce or eliminate the aberration and chromatic aberration of the optical imaging. Therefore, the fixed-focus lens in the present invention maintains a smaller degree of aberration, chromatic aberration, and distortion of imaging while having a larger FOV.

Furthermore, the fixed-focus lens according to another embodiment of the present invention is an L-shaped lens, which effectively reduces the total length of the lens, such that the RPTV adopting the fixed-focus lens in the present invention is made thinner.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, comprising:
   a first lens group, having a negative refractive power, comprising a plurality of lenses disposed between an object side and an image side, wherein the plurality of lenses of the first lens group comprises at least one aspheric lens;
   a second lens group, disposed between the first lens group and the image side, having a positive refractive power, and comprising two lenses arranged from the object side to the image side, wherein refractive powers of the two lenses of the second lens group are positive; and
   a third lens group, disposed between the second lens group and the image side, having a positive refractive power, and comprising a first triple cemented lens and a second triple cemented lens arranged from the object side to the image side in sequence.

2. The fixed-focus lens as claimed in claim 1, wherein an effective focal length of the fixed-focus lens is f, and an effective focal length of the first lens group is $f_1$, and $1.0<|f_1/f|<3.3$.

3. The fixed-focus lens as claimed in claim 1, wherein the lens closest to the object side of the first lens group is an aspheric lens.

4. The fixed-focus lens as claimed in claim 3, wherein refractive powers of at least two of the lenses of the first lens group are negative.

5. The fixed-focus lens as claimed in claim 4, wherein each of the lenses having the negative refractive power of the first lens group comprises a biconcave lens or a convex-concave lens.

6. The fixed-focus lens as claimed in claim 1, wherein the first lens group comprises a first lens, a second lens, and a third lens arranged from the object side to the image side in sequence, refractive powers of the first lens, the second lens and the third lens are negative, and the first lens is an aspheric lens.

7. The fixed-focus lens as claimed in claim 6, wherein each of the first lens and the second lens is a convex-concave lens with a convex surface facing the object side, and the third lens is a biconcave lens.

8. The fixed-focus lens as claimed in claim 1, wherein an effective focal length of the fixed-focus lens is f, and an effective focal length of the second lens group is $f_2$, and $5.4<"f_2/f|<9.6$.

9. The fixed-focus lens as claimed in claim 1, the second lens group comprises a fourth lens and a fifth lens arranged from the object side to the image side in sequence, wherein the fourth lens is a biconvex lens or a concave-convex lens with a convex surface facing the object side, and the fifth lens is a concave-convex lens with a convex surface facing the object side.

10. The fixed-focus lens as claimed in claim 1, wherein an effective focal length of the fixed-focus lens is f, and an effective focal length of the third lens group is $f_3$, and $3.3<|f_3/f|<7.5$.

11. The fixed-focus lens as claimed in claim 1, wherein the third lens group further comprises a lens having a positive refractive power and being disposed between the second triple cemented lens and the image side or between the first triple cemented lens and the second triple cemented lens.

12. The fixed-focus lens as claimed in claim 1, wherein an effective focal length of any one of the triple cemented lenses is $f_C$, and an effective focal length of the third lens group is $f_3$, and each triple cemented lens satisfies $0.3<|f_C/f_3|<5.5$.

13. The fixed-focus lens as claimed in claim 1, wherein lenses constituting each of the triple cemented lenses are two lenses having positive refractive powers and one lens having a negative refractive power, or are two lenses having negative refractive powers and one lens having a positive refractive power.

14. The fixed-focus lens as claimed in claim 13, wherein a refractive index of any one of the lenses having the positive refractive powers and constituting each triple cemented lens is $N_p$, and a refractive index of any one of the lenses having the negative refractive powers and constituting each triple cemented lens is $N_n$, and the lenses constituting each triple cemented lens satisfy $0.21<|N_p-N_n|<0.35$.

15. The fixed-focus lens as claimed in claim 1, the first triple cemented lens comprises a sixth lens, a seventh lens and an eighth lens arranged from the object side to the image side in sequence, and the second triple cemented lens comprises a ninth lens, a tenth lens, and an eleventh lens arranged from the object side to the image side in sequence, and refractive powers of the sixth lens to the eleventh lens are negative, positive, negative, positive, negative, and positive in sequence.

16. The fixed-focus lens as claimed in claim 15, wherein the third lens group further comprises:
a twelfth lens, disposed between the eighth lens and the ninth lens, having a positive refractive power; and
a thirteenth lens, disposed between the eleventh lens and the image side, having a positive refractive power.

17. The fixed-focus lens as claimed in claim 16, wherein the sixth lens to the thirteenth lens are a convex-concave lens with a convex surface facing the object side, a biconvex lens, a biconcave lens, a biconvex lens, a biconcave lens, a biconvex lens, a biconvex lens, and a biconvex lens in sequence.

18. The fixed-focus lens as claimed in claim 16, wherein the third lens group further comprises a fourteenth lens having a positive refractive power disposed between the second lens group and the sixth lens.

19. The fixed-focus lens as claimed in claim 18, wherein the sixth lens to the fourteenth lens are a biconcave lens, a biconvex lens, a convex-concave lens with a convex surface facing the image side, a concave-convex lens with a convex surface facing the image side, a biconcave lens, a biconvex lens, a biconvex lens, a biconvex lens, and a biconvex lens in sequence.

20. The fixed-focus lens as claimed in claim 1, further comprising a reflecting device disposed between the first lens group and the second lens group for reflecting light beams from the second lens group to the first lens group.

21. The fixed-focus lens as claimed in claim 1, further comprising an aperture stop disposed between the second lens group and the third lens group.

22. A fixed-focus lens, having an effective focal length of f, comprising:
a first lens group, having a negative refractive power, comprising a plurality of lenses disposed between an object side and an image side, wherein the plurality of lenses of the first lens group comprises at least one aspheric lens, an effective focal length of the first lens group is f1, and $1.0<|f_1/f|<3.3$;
a second lens group, disposed between the first lens group and the image side, having a positive refractive power, and comprising two lenses arranged from the object side to the image side, wherein refractive powers of the two lenses of the second lens group are positive, an effective focal length of the second lens group is $f_2$, and $5.4<|f_2/f|<9.6$; and
a third lens group, disposed between the second lens group and the image side, having a positive refractive power, and comprising a first triple cemented lens and a second triple cemented lens arranged from the object side to the image side in sequence.

23. The fixed-focus lens as claimed in claim 22, wherein the lens closest to the object side of the first lens group is an aspheric lens.

24. The fixed-focus lens as claimed in claim 23, wherein refractive powers of at least two of the lenses of the first lens group are negative.

25. The fixed-focus lens as claimed in claim 24, wherein the third lens group further comprises a lens having a positive refractive power and being disposed between the first triple cemented lens and the second triple cemented lens or between the second triple cemented lens and the image side.

* * * * *